United States Patent [19]

Bosquain et al.

[11] Patent Number: 5,154,859
[45] Date of Patent: Oct. 13, 1992

[54] HEAT AND MATERIAL EXCHANGING DEVICE AND METHOD OF MANUFACTURING SAID DEVICE

[75] Inventors: Maurice Bosquain, Paris; Jean-Yves Lehman, Maison Alfort; Franqois Darchis, Buc; Bruno LePrince-Ringuet, Paris, all of France

[73] Assignee: L'Air Liquide, Societe Anonyme pour L'etude e l'Exploitation des Procedes Georges Claude, Paris, France

[21] Appl. No.: 733,053

[22] Filed: Jul. 15, 1991

Related U.S. Application Data

[63] Continuation of Ser. No. 432,733, filed as PCT/FR89/00197, Apr. 26, 1989, abandoned.

[30] Foreign Application Priority Data

Apr. 28, 1988 [FR] France .............................. 8805685

[51] Int. Cl.⁵ ................................................ B01F 3/04
[52] U.S. Cl. ................................................ 261/112.2
[58] Field of Search ................................... 261/112.2

[56] References Cited

U.S. PATENT DOCUMENTS

| | | | |
|---|---|---|---|
| 1,462,475 | 7/1923 | Atkinson . | |
| 3,540,702 | 11/1970 | Uyama | 261/112.2 |
| 3,574,032 | 4/1971 | Norback et al. | 261/112.2 |
| 3,969,473 | 7/1976 | Meek | 261/112.2 |
| 4,225,540 | 9/1980 | Kauschke | 261/112.2 |
| 4,427,607 | 1/1984 | Korsell | 261/112.2 |
| 4,676,934 | 6/1987 | Seah | 261/112.2 |
| 4,801,410 | 1/1989 | Kinney, Jr. et al. | 261/112.2 |

FOREIGN PATENT DOCUMENTS

| | | |
|---|---|---|
| 0190435 | 8/1986 | European Pat. Off. . |
| 0215413 | 3/1987 | European Pat. Off. . |
| 2942843 | 5/1980 | Fed. Rep. of Germany . |
| 1489126 | 7/1967 | France . |
| 2183704 | 12/1973 | France . |
| 2329371 | 5/1977 | France . |
| 438217 | 11/1967 | Switzerland . |
| 966747 | 8/1964 | United Kingdom . |
| 1408774 | 10/1975 | United Kingdom . |

*Primary Examiner*—Tim Miles
*Attorney, Agent, or Firm*—Young & Thompson

[57] ABSTRACT

A jacket encloses a packet of corrugated plates (3) each disposed in a generally vertical plane, the corrugations being oblique and descending in opposite directions from one plate to the following plate. Each corrugation valley (5) has a lower end opening out laterally which includes a projecting obstacle (7) in the vicinity of this lower end. In this way, liquid that would otherwise accumulate on the vertical walls of the jacket, where it would participate relatively little in heat and material exchange, is instead diverted toward the interior.

21 Claims, 3 Drawing Sheets

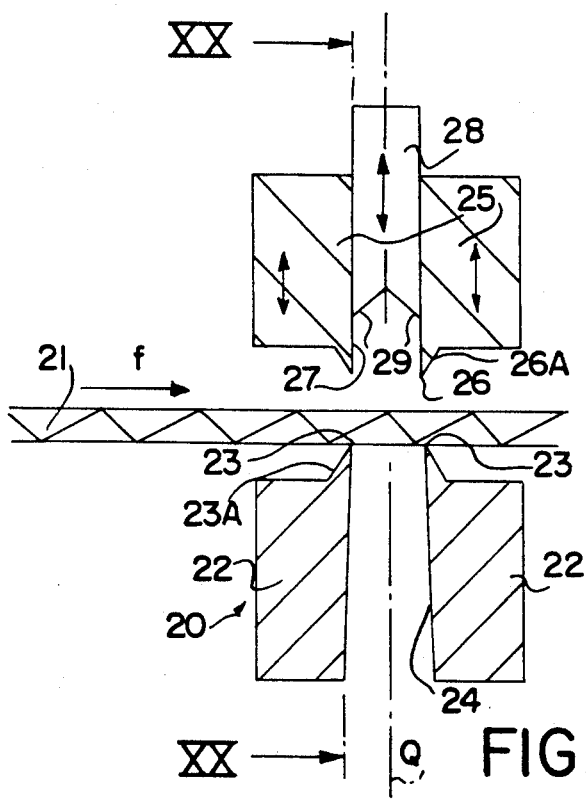
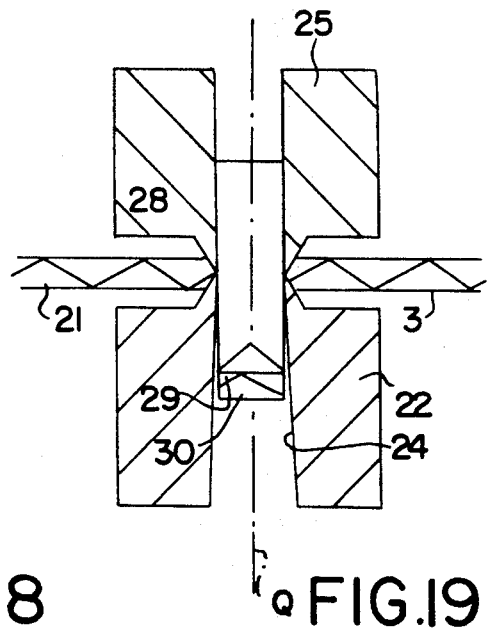
FIG. 18   FIG. 19
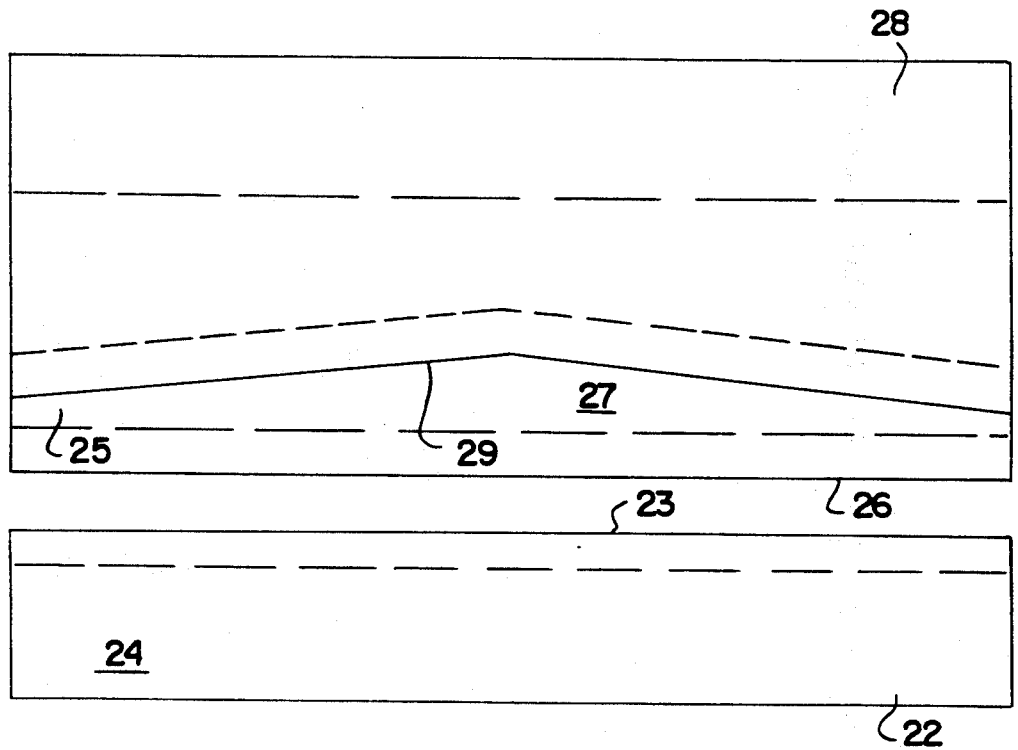
FIG. 20

HEAT AND MATERIAL EXCHANGING DEVICE AND METHOD OF MANUFACTURING SAID DEVICE

This application is a continuation of application Ser. No. 432,733, filed as PCT/FR89/00197, Apr. 26, 1989, now abandoned.

The present invention relates to devices for the countercurrent exchange of heat and material between a descending liquid and a rising gas, of the type comprising a packet of corrugated plates each disposed in a generally vertical plane one against the other, the corrugations being oblique and descending in opposite directions from one plate to the following plate, the corrugations of each plate defining first and second corrugation valleys which respectively open out downwardly and upwardly on a lateral edge of the plate.

These devices, which are often termed "crossed corrugated packings", present, in their application to distillation, a difficult problem of the preservation of a good distribution of the descending liquid throughout the height of the sections of the distillation column equipped with such packings. Indeed, the liquid has a tendency to migrate toward the wall which surrounds the packing by accumulation resulting from a running either on this wall or along the edge of the plates, which impairs the performances of the distillation column.

An object of the invention is to provide a device which avoids in a particularly economical manner this "wall effect".

The invention therefore provides a device for the exchange of heat and material of the aforementioned type, characterized in that each of said first corrugation valleys of each plate comprises in the vicinity of its lower end an obstacle to the flow of the liquid.

In order to form such an obstacle, preferably, the line of the largest slope of each of said first corrugation valleys is distinctly modified in the vicinity of its lower end by deformation of the plate.

In a preferred embodiment of the invention, the lower end portions of the corrugations forming said first corrugation valleys are crushed to the median plane of the plate so as to form drawn zones having substantially the shape of an isosceles triangle located alternately on the two sides of said plane and having their bases located, when viewed in end elevation, in the extension of each other.

For columns having a relatively small diameter in particular (up to a diameter on the order of 1 to 2 m), it is advantageous to arrange that the packet of plates is disposed directly in the sleeve of the column without direct contact with the column, a relative seal being provided by interposition of a plurality of separate members of small height constituted in particular by circular sealing members or rings.

For larger diameters in particular, the packet of plates may be maintained in a strap with interposition of a plurality of separate members of small height constituted in particular by circular ribs which optionally penetrate the packet.

Another object of the invention is to provide a method for manufacturing a device for exchanging heat and material according to the preferred embodiment indicated hereinbefore. According to this method, a corrugated strip is taken and the plates are cut from this strip by means of shears.

Some embodiments of the invention will now be described with reference to the accompanying drawings, in which:

FIGS. 18 and 19 are diagrammatic longitudinal sectional views of shears for producing plates according to the invention, and FIG. 20 is a sectional view taken on line XX—XX of FIG. 18.

FIG. 1 illustrates the general arrangement of the main part of a distillation column, for example an air distillation column. This main part mainly comprises a cylindrical sleeve 1 in which are stacked packing elements 2 having a generally cylindrical shape.

Each element 2, of the so-called "crossed-corrugated" type, comprises a packet of plates 3 having a generally rectangular shape and corrugated in an oblique manner, the corrugations preferably having a triangular cross-section. The direction of inclination of the corrugations is reversed from one plate to the following, as is clearly shown in FIG. 2.

Figure 1:
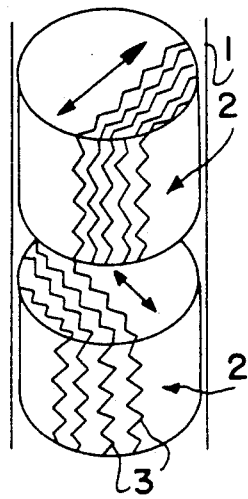
FIG. 1 is a diagrammatic perspective view of the general arrangement of a distillation column equipped with a crossed-corrugated packing.
Figure 2:
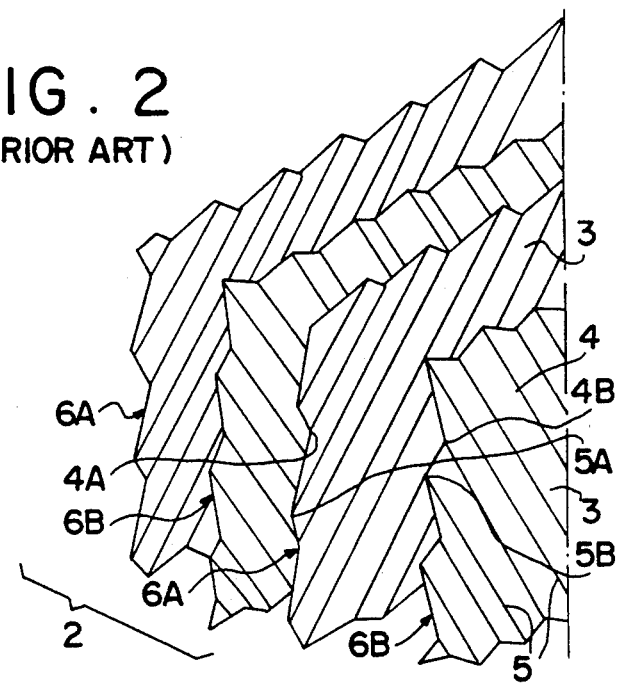
FIG. 2 is an exploded perspective view of the constitution of an element of the packing of FIG. 1 with plates of known structures.

All the plates of a given element are disposed in parallel vertical planes and have the same height. On the other hand, their length, or horizontal dimension, increases from a minimum value for an end plate to a maximum value for the median plate, then again decreases down to the same minimum value for the other end plate. Thus, when all the plates are pressed against one another, there is obtained an element 2 of generally cylindrical shape whose contour is shown in FIG. 1. On each side, each plate comprises corrugation crests 4 and corrugation valleys 5 defining a multitude of inclined passageways. The crests 4 each have a lower end 4A and an upper end 4B, and the valleys 5 each have a lower end 5A and an upper end 5B. As will be seen hereinafter, the invention only concerns the passageways which laterally open out, i.e. downwardly on a vertical lateral edge 6A of the plate, or upwardly on a vertical lateral edge 6B of the plate. The corrugation crests of one side of a plate touch those of the confronting side of the adjacent plate and form a multitude of crossing points; the latter promote the distribution and the contacting of the fluids. Furthermore, for the same purpose, each element 2 is angularly off-set 90° relative to the following element, as can be seen in FIG. 1, and each plate comprises a multitude of perforations (not shown in the drawings). Shown in FIGS. 1 and 2 is a conventional crossed-corrugated packing in which the plates have distinctly cut-out vertical edges forming a zig-zag shape when viewed from the end. Experience has shown that, with these known packings, the wall effect, i.e. the accumulation of the liquid on the wall of the sleeve or along the edge of the plates, is great and the following Figures which represent packings according to the invention permit effectively solving this problem by the creation of a "mirror effect", as will be clear hereinafter.

FIGS. 3 to 6 represent a plate 3 which, in service, is disposed in the same way as those of FIGS. 1 and 2 but has a vertical edge of modified configuration, more precisely the lateral edge 6A onto which the inclined passageways open downwardly.

Indeed, for manufacturing the plates 3, a metal band of great length is taken and is corrugated obliquely, then each plate is cut to the desired length by shears perpendicular to the longitudinal edges of the band, as will be described in more detail hereinafter with reference to FIGS. 18 to 20.

Figure 3:
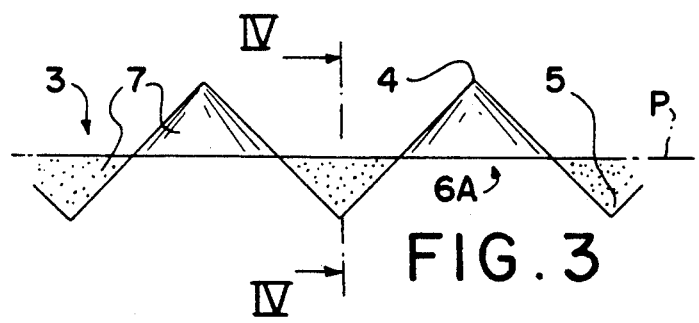
FIG. 3 is a diagrammatic end elevational view of a plate of a packing according to the invention.
Figure 4:
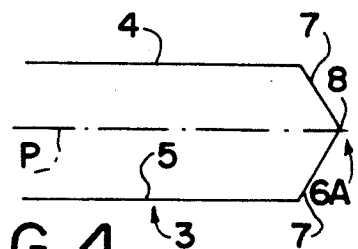
FIG. 4 is a sectional view taken on line IV—IV of FIG. 3.
Figure 5:
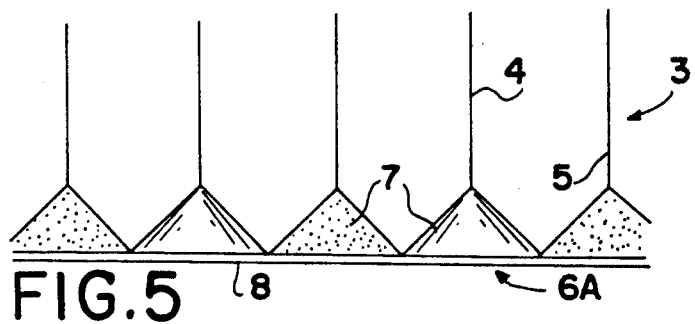
FIG. 5 is a plan view of the plate of FIG. 3.
Figure 6:
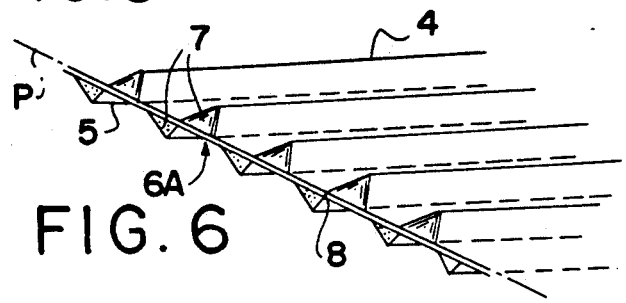
FIG. 6 is a perspective view of the same plate.

This results in a crushing of the front edge of each plate (with respect to the direction of travel of the band): the corrugation crests 4 and the corrugation valleys 5 are brought to the median plane P of the plate and alternately form on each side of this plane zones 7 having the shape of isosceles triangles indicated by the fine lines for the corrugation crests and by dots for the corrugation valleys in FIGS. 3, 5 and 6.

When viewed from the end (FIG. 3), the bases of the isosceles triangles are in the extension of one another in the plane P.

In practice, owing to the stiffness of the corrugated metal and the presence of orifices with which the plates are provided, the drawing of the material is not perfectly even and the zones 7 are not perfectly triangular and may more or less deviate from this shape and include local tears. FIGS. 3 to 6 must therefore be considered as theoretical diagrams. Moreover, the crushing brought about by the shears produces a small flattened marginal portion 8 (FIGS. 4 to 6) along the edge 6A of the plate.

In operation, it is found that the presence of the zone 7 creates in each passageway close to the edge 6A an obstacle to the flow of the liquid up to this edge and, in combination with the presence of the crossing points of the corrugation crests of the different plates, ensures an effective return of the liquid toward the interior of the packing. Consequently, the wall effect is almost completely eliminated and replaced by a "mirror effect" and the efficiency of the column is considerably improved.

Figure 7:
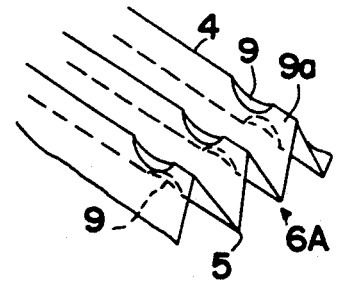
FIGS. 7 and 8 are perspective views of two other embodiments of the invention.

FIG. 7 shows another type of obstacle which may be created close to the edge 6A: by moving toward each other two rods (not shown) parallel to the edges 6A, cavities 9 are simultaneously formed in the corrugation crests and valleys at a short distance from this edge. Preferably, the presence of at least one crossing point 9a between the cavity 9 and the lower end of the corresponding corrugation crest 5 is ensured.

Figure 8:
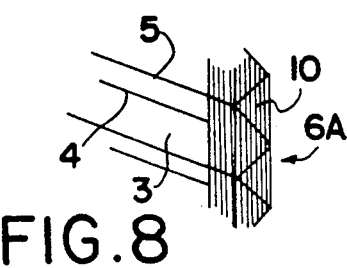

In the variant shown in FIG. 8, the corrugation valleys are completely stopped up on the two sides of the plate on a short distance by a suitable filling material 10 which may be injected, pressed, inserted, welded, etc. The depth of the filling is chosen to be sufficient to ensure that the liquid in each corrugation is returned in a sure manner toward the interior of the packing. A convenient way to produce this stopping up consists in performing an overall plugging on the finished packet of all the corrugations opening onto the periphery of this packet, in which case the upper ends of the corrugations on the edges 6B are also plugged, which constitutes no particular inconvenience.

Figure 9:
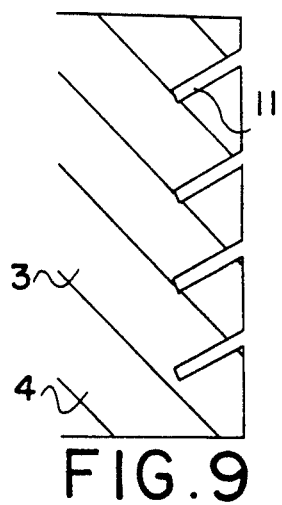
FIGS. 9 to 11 are diagrammatic views of packings according to the invention provided with peripheral notches.
Figure 10:
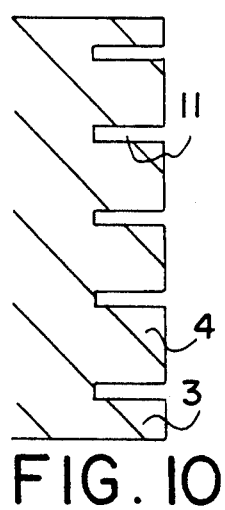
Figure 11:
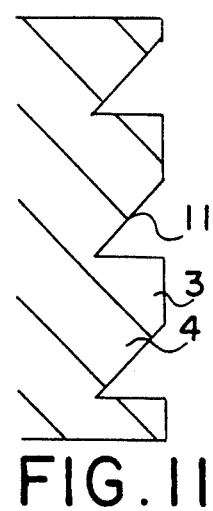

FIGS. 9 to 11 illustrate another manner of preventing the liquid from reaching the edge 6A of the plates, consisting in providing notches 11 along this edge which cut the corrugations. These notches may be for example linear and downwardly inclined in the direction opposed to the descending corrugations (FIG. 9), linear and horizontal (FIG. 10) or triangular with a horizontal lower edge and an oblique upper edge descending in the direction opposed to the descending corrugations (FIG. 11). As before, these notches may be produced with a saw on a stack of plates.

FIGS. 12 to 17 show advantageous ways of mounting the packings according to the invention which prevent the liquid which has nonetheless reached the edge 6A of the plates from running along the wall of the sleeve.

Figure 14:
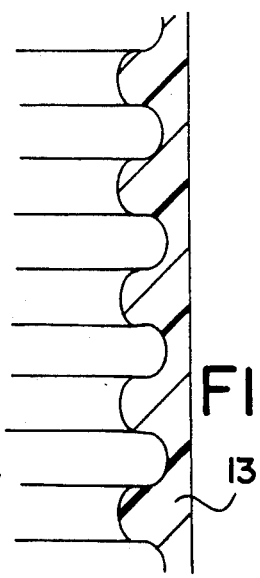
FIG. 14 is a view of a member which is part of a variant of the assembly of FIG. 12.
Figure 15:
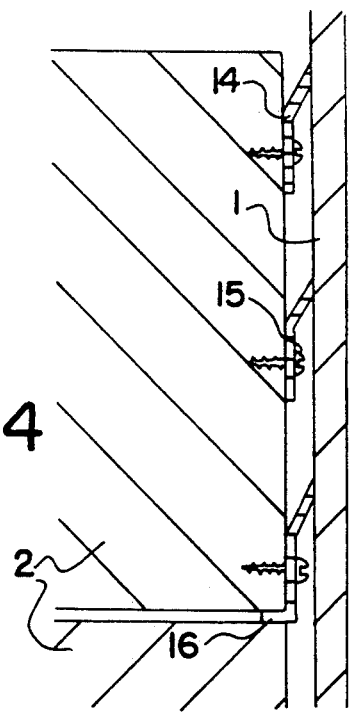
FIG. 15 is a diagrammatic illustration of another variant of the assembly of FIG. 12.
Figure 16:
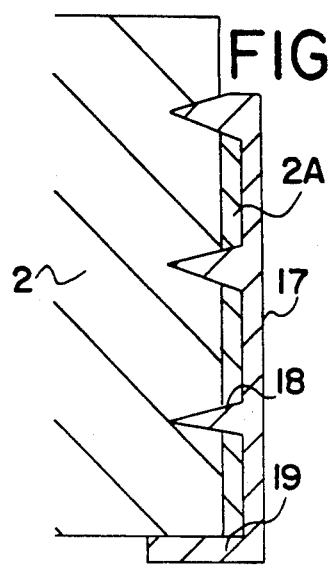
FIG. 16 is a diagrammatic illustration of another manner in which a packing according to the invention may be mounted in the sleeve of a distillation column.
Figure 17:
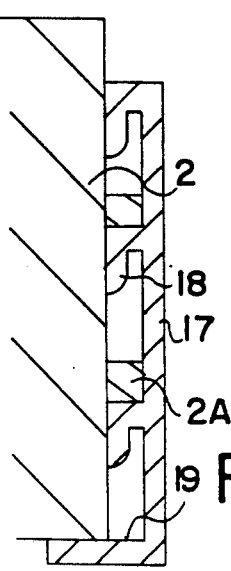
FIG. 17 is a diagrammatic illustration of a variant of the assembly of FIG. 16.

FIGS. 12 to 15 correspond in particular to columns of relatively small diameter, up to about 1 and 2 m, and FIGS. 16 and 17 in particular correspond to the larger diameters.

Figure 12:
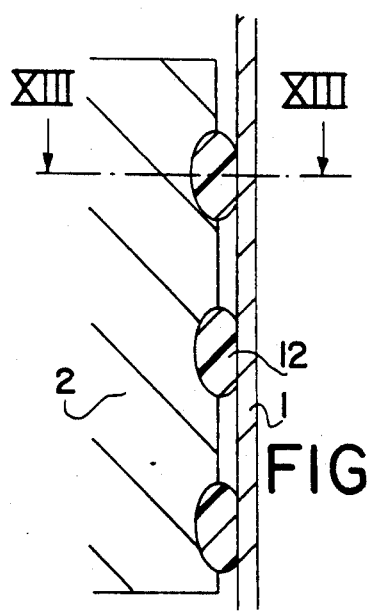
FIG. 12 is a diagrammatic illustration of the manner in which a packing according to the invention may be mounted in the sleeve of a distillation column.
Figure 13:
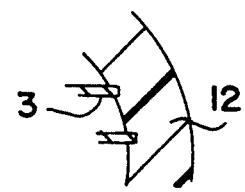
FIG. 13 is a partial sectional view taken on line XIII—XIII of FIG. 12.

In FIGS. 12 and 13, the packing element 2 is mounted directly in the sleeve 1 with interposition of a plurality of spaced-apart circular sealing elements 12 of small height. These sealing elements are flexible so that the edge of the plates slightly penetrate them, as can be seen in FIG. 13 and are maintained at a given distance from the sleeve.

The sealing members 12 may be replaced by a single sealing member 13 which has corrugations on its inner side as shown in FIG. 14.

In the embodiment shown in FIG. 15, the element 2 is mounted in the sleeve with interposition of a series of separate members 14 constituted by a plurality of rings which are fixed on the inner side to the packing by screws 15 and bear on the outer side against the sleeve and thus provide a relative seal. The part of the rings in contact with the packing has a small height and is spaced from the sleeve. As illustrated, the lower ring may have a heel 16 which acts as a support for the element 2 and as an element for returning the liquid toward the axis of the column. The heads of the screws 15, or other positioning means, may be employed for guaranteeing a minimum free space between the element 2 and the sleeve 1.

For large diameters (FIGS. 16 and 17), it may be preferable to provide an intermediate device for maintaining the packets of plates and facilitating the handling of the latter, this device being in turn mounted in the sleeve of the column by suitable means (not shown). A peripheral strap 17 is used which is provided with a plurality of circular ribs 18 and optionally a lower heel 19. The ribs 18 may penetrate the stack of plates (FIG. 16) or merely bear against the edges of the plates (FIG. 17). In this case, there is of course also provided a relative seal between the sleeve and the plates to ensure that the rising gas does not by-pass the packing. For example, the strap 17 may include externally a circular sealing member such as the sealing member 12 of FIG. 12 or the ring 14 of FIG. 15, this sealing member being applied in a sealed manner against the sleeve of the column, while the seal between the strap 17 and the plates is achieved by means of the ribs 18.

In each of the arrangements of FIGS. 12 to 17, the annular space created between the packing element 2 and the cylindrical wall (sleeve 1 or strap 17) surrounding it provides the rising gas with the possibility of by-passing the liquid for a certain height, which may be disadvantageous in certain cases, in particular at the top of the columns when a production of high purity is desired. To avoid this, a part of these annular spaces may be filled with a packing 2A having preferably a finer structure than that of element 2, for example a felt or a metal fabric. The packing 2A may occupy the whole of every second or third annular space (FIG. 16), or a part, preferably the lower part, in which the liquid may accumulate, of all these spaces (FIG. 17), or only some thereof.

FIGS. 18 to 20 illustrate the manner in which the shearing mentioned hereinbefore is effected.

The tool, or shears, 20 is symmetrical relative to a vertical plane Q perpendicular to the horizontal direction f of travel of the initial corrugated band 21. It comprises:

two fixed lower blades 22 the upper edge 23 of which is rectilinear, horizontal and parallel to the plane Q; the confronting sides 24 of the two blades 22 slightly diverge from each other in the downward direction and the edges 23 are bordered externally by outer surfaces 23A inclined at about 30° to the vertical;

two upper vertically movable band presser members 25 having a lower edge 26 which is also rectilinear, horizontal and parallel to the plane Q. Each edge 26 is located just above the corresponding edge 23 and is also bordered externally by a surface 26A inclined at about 30° to the vertical. Each band presser member has in confronting relation to the other a surface 27 parallel to the plane Q;

an upper double blade 28 vertically slidably guided between the surfaces 27; its lower end has, when viewed in a direction perpendicular to the direction f (FIGS. 18 and 19), an inverted V-shaped section which defines two cutting edges 29 adjacent to the surfaces 27. As can be seen in FIG. 20, each edge has, when viewed in the direction f, a widely divergent inverted V-shaped section.

In operation, with the band presser members 25 and the blade 28 in the raised position (FIG. 18), the band 21 is fed by bearing against the two edges 23 until a predetermined length of the band travels beyond the downstream edge 23 in the downstream direction (relative to the direction of arrow f).

The band presser members 25 are then lowered and produce a double clamping of the band 21 between each edge 26 and the facing edge 23 and causes the drawing of the metal forming the zones 7 described hereinbefore, and the narrow marginal portion 8 whose width corresponds to the width of the edges 23 and 26. During this operation, the zones 7 assume the shape of the inclined surfaces 23A and 26A.

The blade 28 is then lowered and cuts away a scrap portion 30 (FIG. 19) between the two lower blades and detaches a plate 3 of predetermined length.

Owing to the symmetry of the shears, the front edge of the band 20 which has not yet been cut to length has a configuration which is similar or even identical to that of the rear edge of the plate 3 which has just been detached. Consequently, each plate has similar front and rear edges, which, in service, has no essential function relating to the distribution of the liquid but facilitates the positioning of the plates by a more easy sliding of the plates against one another for forming the element 2. Moreover, there is in addition an increased safety for the personnel handling the plates and/or the stacks since the edges sheared in this way are less sharp.

We claim:

1. Device (2) for the countercurrent exchange of heat and material between a descending liquid and a rising gas, of the type comprising a packet of corrugated plates (3) each disposed in a substantially vertical plane and against one another, the corrugations being oblique and descending in opposite directions from one plate to the following plate, the corrugations of each plate defining first and second corrugation valleys (5) which have ends that open upwardly and downwardly, respectively, on a lateral upright edge (6A, 6B) of the plate, each plate (3) having a generally rectangular configuration, said packet of plates (3) having a generally cylindrical configuration and being disposed in a surrounding sleeve (1) having an inner wall, and means (7; 9; 10; 11) adjacent the lower ends of said first corrugation valleys (5) for preventing liquid descending in said first corrugation valleys (5) from accumulating on said inner wall of said sleeve (1).

2. Device according to claim 1, wherein the line of the largest slope of each of said first corrugation valleys (5) is distinctly modified in the vicinity of its lower end (5A) by deformation of the plate (3).

3. Device according to claim 1, wherein said preventing means comprises an obstacle which is constituted by a plugging of said lower ends (5A) by means of a filling material (10).

4. Device according to claim 1, wherein the packet (3) of plates (3) is provided in its periphery with notches (11) which cut at least the descending corrugations.

5. Device according to claim 1, wherein each of said second corrugation valleys (5) comprises in the vicinity of its upper end (5B) a configuration similar to the configuration of said first corrugation valleys in the vicinity of their lower end.

6. Device according to claim 1, wherein said sleeve is a portion of an air distillation column.

7. Device according to claim 1, characterized in that is comprises at the base of the packet (2) a heel (16; 19) projecting under said packet.

8. Method for manufacturing a device (2) for the countercurrent exchange of heat and material between a descending liquid and a rising gas, of the type comprising a packet of corrugated plates (3) each disposed in a vertical plane and against one another, the corrugations being oblique and descending in opposite directions from one plate to the following plate, the corrugations of each plate defining first and second corrugation valleys (5) which respectively open out upwardly and downwardly on a lateral edge (6A, 6B) of the plate, characterized in that each of said first corrugation valleys (5) includes in the vicinity of its lower end (5A) an obstacle to the flow of the liquid (7; 9; 10; 11), wherein the method comprises starting with a corrugated band (21) and cutting the plates (3) from said band to form said obstacle by means of a shears.

9. Method according to claim 8, further comprising clamping the corrugated band (21) between two rectilinear members (23, 24) before cutting it to length.

10. Method according to claim 9, further comprising pinching the corrugated band (21) in two places spaced apart in the direction (F) of travel of the band and effecting two cuts, one in each of said places.

11. Device (2) for the countercurrent exchange of heat and material between a descending liquid and a rising gas, of the type comprising a packet of corrugated plates (3) each disposed in a substantially vertical plane and against one another, the corrugations being oblique and descending in opposite directions from one plate to the following plate, the corrugations of each plate defining first and second corrugation valleys (5) which have ends that open upwardly and downwardly, respectively, on a lateral upright edge (6A, 6B) of the plate, each of said first corrugation valleys (5) having in the vicinity of its lower end (5A) an obstacle to the flow of the liquid (7; 9; 10; 11), the lower end portions of said first corrugation valleys (5) being crushed to the median plane (P) of the plate (3) so as to constitute drawn zones (7) having substantially the shape of isosceles triangles located alternately on the two sides of said plane and having bases which are located, when viewed from the end, in the extension of each other.

12. Device (2) for the countercurrent exchange of heat and material between a descending liquid and a rising gas, of the type comprising a packet of corrugated plates (3) each disposed in a substantially vertical plane and against one another, the corrugations being oblique and descending in opposite directions from one plate to the following plate, the corrugations of each plate defining first and second corrugation valleys (5) which have ends that open upwardly and downwardly, respectively, on a lateral upright edge (6A, 6B) of the plate, each of said first corrugation valleys (5) having in the vicinity of its lower end (5A) an obstacle to the flow of the liquid (7; 9; 10; 11), the obstacle comprising a partial crushing of all said first corrugation valleys (5), said crushing producing a cavity (9) at a short distance from said lower ends (4A, 5A).

13. Device (2) for the countercurrent exchange of heat and material between a descending liquid and a rising gas, of the type comprising a packet of corrugated plates (3) each disposed in a substantially vertical plane and against one another, the corrugations being oblique and descending in opposite directions from one plate to the following plate, the corrugations of each plate defining first and second corrugation valleys (5) which have ends that open upwardly and downwardly, respectively, on a lateral upright edge (6A, 6B) of the plate, each of said first corrugation valleys (5) having in the vicinity of its lower end (5A) an obstacle to the flow of the liquid (7; 9; 10; 11), the packet (2) being disposed directly in a sleeve (1) with no direct contact with the sleeve, a relative seal being provided by interposition of a plurality of separate members of small height constituted by circular sealing members (12; 13; 14; 18).

14. Device according to claim 13, wherein said circular sealing members comprise circular ribs (18) which penetrate the packet.

15. Device according to claim 14, there being annular spaces between said circular sealing members and a part of said annular spaces being filled with a porous packing (2a) having a finer structure than the packet (2) of plates (3).

16. A device for the countercurrent exchange of heat and material between a descending liquid and a rising gas, comprising a packet of corrugated plates each disposed in a substantially vertical plane and against one another, the corrugations being oblique and descending in opposite directions from one plate to the following plate, the corrugations of each plate defining a first and a second series of straight parallel corrugation valleys which have ends that open upwardly and downwardly, respectively, on lateral upright edges of the plate, each plate having a generally rectangular configuration, said packet of plates having a generally cylindrical configuration and being disposed in a surrounding sleeve having an inner wall, and means adjacent the lower ends of said first corrugation valleys for preventing liquid descending in said first corrugation valleys from accumulating on said inner wall of said sleeve.

17. Device according to claim 16, wherein said sleeve is a portion of an air distillation column.

18. The device of claim 16, wherein said preventing means comprises an obstacle which protrudes in said valley, at least partially obstructing said valley.

19. The device of claim 18, wherein said obstacle is integral with said plate.

20. The device of claim 16, wherein said preventing means comprises an obstacle which is formed by a cut extending from said lateral edge over at least two adjacent said valleys.

21. The device of claim 20, wherein said cut extends at an angle relative to said lateral edges.

* * * * *